(12) United States Patent
Mu et al.

(10) Patent No.: US 10,397,933 B1
(45) Date of Patent: Aug. 27, 2019

(54) INTERFERENCE CANCELLATION FOR RECEIVERS WITH MULTIPLE ANTENNAS

(71) Applicant: Marvell International Ltd., Hamilton (BM)

(72) Inventors: Hua Mu, San Jose, CA (US); Xiayu Zheng, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/849,213

(22) Filed: Dec. 20, 2017

Related U.S. Application Data

(60) Provisional application No. 62/444,519, filed on Jan. 10, 2017.

(51) Int. Cl.
  *H04W 72/08* (2009.01)
  *H04B 7/08* (2006.01)

(52) U.S. Cl.
  CPC ........ *H04W 72/082* (2013.01); *H04B 7/0817* (2013.01); *H04B 7/0857* (2013.01)

(58) Field of Classification Search
  None
  See application file for complete search history.

(56) References Cited

U.S. PATENT DOCUMENTS

| | | | |
|---|---|---|---|
| 7,242,720 B2 | 7/2007 | Sugiyama et al. | |
| 7,826,337 B2 | 11/2010 | Shi et al. | |
| 8,995,543 B2 | 3/2015 | Fechtel et al. | |
| 9,209,873 B1 | 12/2015 | Zhang et al. | |
| 2006/0274691 A1* | 12/2006 | Naguib | H04L 1/1819 370/330 |
| 2007/0030914 A1* | 2/2007 | Ding | H04L 25/024 375/260 |
| 2007/0249296 A1 | 10/2007 | Howard et al. | |
| 2009/0180404 A1* | 7/2009 | Jung | H04B 7/15585 370/279 |
| 2012/0288021 A1* | 11/2012 | Park | H04B 7/024 375/260 |

(Continued)

OTHER PUBLICATIONS

"Amendment 4: Enhancements for Very High Throughput for Operation in Bands below 6 GHz", IEEE Std 802.11ac-2013, 2012, 425 pages.

(Continued)

*Primary Examiner* — Hong S Cho

(57) ABSTRACT

The present disclosure describes apparatuses and methods of interference cancellation for receivers with multiple antennas. In some aspects, an interference packet transmitted by an interfering device of a wireless environment is received via multiple antennas of a device. Based on the interference packet, an interference channel that describes interference in the wireless environment is estimated. The device then receives an intended packet through the wireless environment in which the interfering device is operating. At least a portion of interference received with the intended packet, such as interference caused by other interfering packets, is cancelled using the interference channel. By so doing, a receiver may reduce effects of interfering packets or signals of the wireless environment to improve receive performance (e.g., bit-error rate) for packets that are intended for reception by the device.

20 Claims, 8 Drawing Sheets

(56) References Cited

U.S. PATENT DOCUMENTS

| | | |
|---|---|---|
| 2016/0234042 A9* | 8/2016 | Lopez de Victoria ...................... H04L 25/0224 |
| 2016/0285525 A1 | 9/2016 | Budianu et al. |
| 2017/0214429 A1* | 7/2017 | Eistein ................. H04B 1/1027 |
| 2018/0270038 A1* | 9/2018 | Oteri ..................... H04L 5/0037 |

OTHER PUBLICATIONS

"Amendment 5: Enhancements for Higher Throughput", 2007, 536.
"Pre-Interview Communication", U.S. Appl. No. 15/611,050, dated Aug. 10, 2018, 3 pages.
Bellalta, "IEEE 802.11ax: High-Efficiency WLANs", Accepted for publication in IEEE Wireless Communications Magazine. Jul. 2015, Jul. 2015, 16 pages.
Mu, et al., "Utility U.S. Appl. No. 15/849,213, filed Dec. 20, 2017", 46 pages.
"First Action Interview Office Action", U.S. Appl. No. 15/611,050, dated Oct. 19, 2018, 3 pages.
"Pre-Interview Communication", U.S. Appl. No. 15/672,117, dated Nov. 15, 2019, 3 pages.
"Notice of Allowance", U.S. Appl. No. 15/672,117, dated May 2, 2019, 7 pages.
"Notice of Allowance", U.S. Appl. No. 15/611,050, dated Feb. 21, 2019, 5 pages.
"Pre-Interview Communication", U.S. Appl. No. 16/163,167, dated Jun. 25, 2019, 3 pages.

* cited by examiner

INTERFERENCE CANCELLATION FOR RECEIVERS WITH MULTIPLE ANTENNAS

CROSS REFERENCE TO RELATED APPLICATIONS

This present disclosure claims priority to U.S. Provisional Patent Application Ser. No. 62/444,519 filed Jan. 10, 2017, the disclosure of which is incorporated by reference herein in its entirety.

BACKGROUND

Many computing and electronic devices access the Internet or other resources through wireless networks, which are typically provided and administered by an access point or base station. As user numbers and data consumption levels increase, wireless network architects have developed communication techniques to increase spectrum efficiency. In other words, the architects have worked to increase the number of users that can access and the amount of data exchanged through physical resources of a wireless network. To do so, some wireless networking systems implement spatial reuse in which network spectrum is reused for devices that are separated by distance or directionality. For example, two wireless networks may operate using same or similar channels when separated geographically or directionally (e.g., from a base station).

When not sufficiently separated by distance or direction, however, transmission signals from devices of one network may interfere with other devices of another network that are configured to use same or similar (e.g., overlapping) wireless channels for communication. Such situations may commonly arise as user devices move throughout a wireless network resulting in directional conflicts or at boundaries of the wireless network, where transmission power is maximized to reach far away devices. Because an interfering transmitter is typically not part of the other wireless network, devices subject to the interference are unable to provide the transmitter with feedback (e.g., to reduce transmit power) and the interfering transmissions often continue unabated. As such, these interfering transmissions typically impair reception performance of devices in other wireless networks, which can result in lower receive performance or reduced network throughput due to the interference.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described that receives, via multiple antennas of a device, an interference packet transmitted by an interfering transmitter in a wireless environment. An interference channel that describes interference in the wireless environment is estimated based on the interference packet received from the interfering transmitter. The method receives, via the multiple antennas of the device, an intended packet transmitted through the wireless environment in which the interfering transmitter operates. At least a portion of interference received with the intended packet is then cancelled using the interference channel. By so doing, a receiver may reduce effects of interfering packets or signals of the wireless environment to improve performance (e.g., bit-error rate) for packets that are intended for reception by the device.

In other aspects, an apparatus for wireless communication is described that includes multiple antennas and a receiver having multiple inputs coupled to respective ones of the multiple antennas. The receiver is configured to receive data in a wireless environment in which the apparatus operates. The apparatus also includes an interference estimator configured to receive, via the multiple antennas, an interference packet transmitted by an interfering transmitter in the wireless environment. The interference estimator estimates an interference channel that describes interference in the wireless environment based on the interference packet received from the interfering transmitter. An interference canceller of the apparatus is configured to receive, via the multiple antennas, an intended packet transmitted through the wireless environment in which the interfering transmitter operates. The interference canceller then cancels at least a portion of interference received with the intended packet using the interference channel.

In yet other aspects, a System-on-Chip (SoC) is described that includes a wireless transceiver circuit that includes multiple receive chains and a hardware-based processor. The SoC also includes a memory storing processor-executable instructions for implementing an interference estimator and interference canceller. The SoC implements the interference estimator to receive, via the multiple receive chains, an interference packet transmitted by an interfering transmitter of a wireless environment. The interference estimator then estimates an interference channel that describes interference in the wireless environment based on the interference packet received from the interfering transmitter. The interference canceller of the SoC is implemented to receive, via the multiple receive chains, an intended packet transmitted through the wireless environment in which the interfering transmitter operates. The interference canceller then cancels at least a portion of interference received with the intended packet using the interference channel.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of interference cancellation for receivers with multiple antennas are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
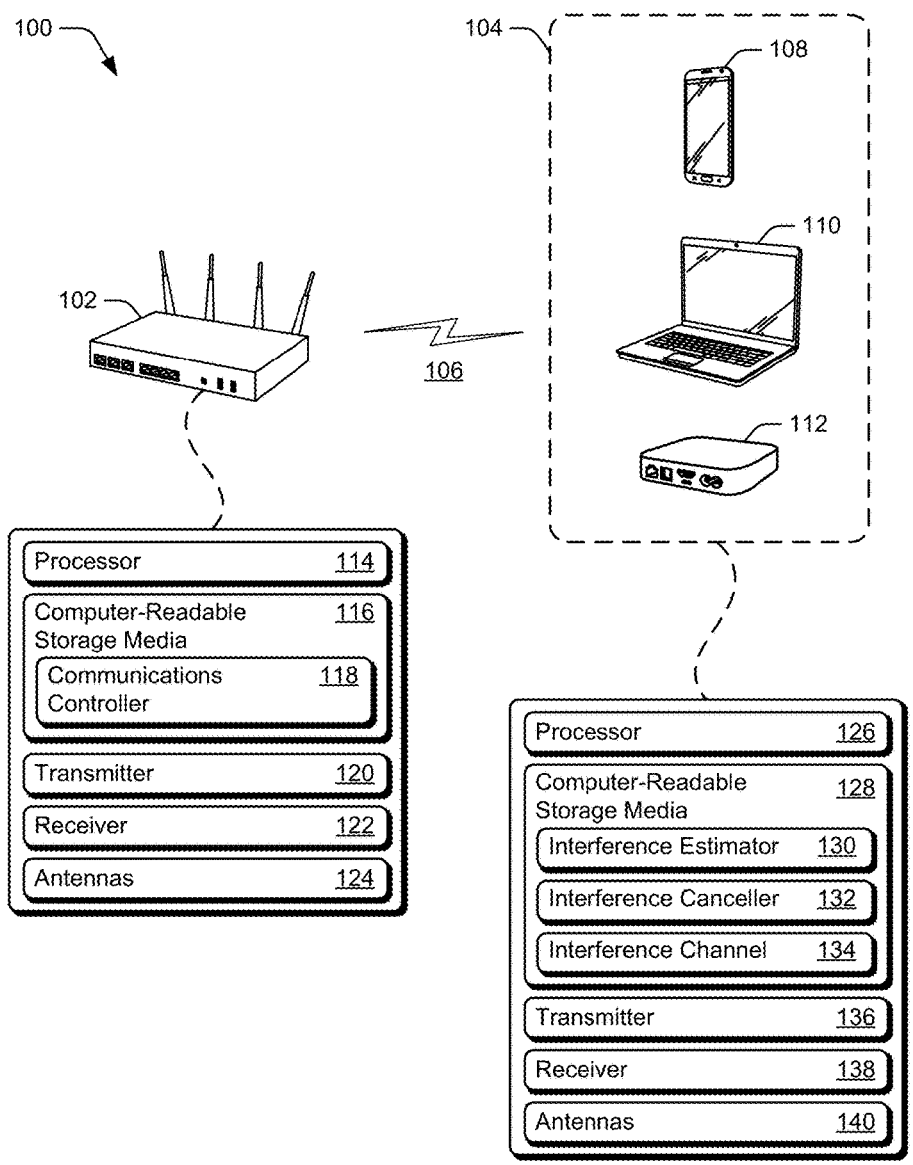
FIG. 1 illustrates an example operating environment having devices that are capable of wireless communication in accordance with one or more aspects.

Conventional techniques of spatial reuse often result in directional or geographical overlaps between multiple wireless networks or respective devices thereof. For example, when communicating proximate an edge or boundary of a wireless network, a base station or client stations may use maximum transmission power when transmitting data packets to the device. These maximum power transmissions often travel into adjacent wireless networks, where the transmissions can cause interference (e.g., co-channel interference) with devices of another network configured to operate on a same or similar frequency. Alternately or additionally, transmissions beamformed (i.e., steered) toward one device may interfere with other devices proximate the target device or within a transmission path of the beamformed transmissions.

In the context of a wireless local-area-network (WLAN), a basic service set (BSS) of stations, such as a base station and client stations, communicate at a physical (PHY) layer over a given channel of wireless spectrum. With spatial reuse, transmissions of similar frequency that originate from a proximate BSS, or overlapping BSS (OBSS), can interfere with stations of the BSS attempting to receive data. Because other stations of the OBSS cannot receive feedback from the stations of BSS receiving the interference, the OBSS often continues transmission of interfering packets or interfering signals despite impairing receive performance (e.g., bit-error rate) of the BSS stations. As such, conventional techniques of spatial reuse and network mapping may result in OBSS interference (e.g., co-channel interference) that impairs station receiver performance or reduces throughput of a wireless network.

This disclosure describes techniques and apparatuses for interference cancellation for receivers with multiple antennas. In some aspects, an interference packet transmitted by an interfering device of a wireless environment is received via multiple antennas of a device. Based on the interference packet, an interference channel that describes interference in the wireless environment is estimated. The device can then receive an intended packet through the wireless environment in which the interfering device is operating. At least a portion of interference received with the intended packet, such as interference caused by other interfering packets, is cancelled using the interference channel. By so doing, a receiver may reduce effects of interfering packets or signals of the wireless environment to improve performance (e.g., bit-error rate) for packets that are intended for reception by the device.

These and other aspects described herein may be performed to enable the cancellation or suppression of interference associated with packets (or signals) transmitted by devices of an OBSS or other sources of co-channel interference (e.g., BlueTooth™ devices). For example, a laptop operating near an OBSS may listen for and receive interfering packets transmitted by a base station of the OBSS. Based on the interfering packets, an interference estimator of the laptop can estimate an interference channel for a wireless environment in which the laptop operates. Generally, the wireless environment may include a BSS to which the laptop is associated as well as other wireless communication devices, such as other OBSSs (or interfering transmitters) that can degrade or impair reception performance devices in the environment. Using the interference channel (e.g., information characterizing the interference), an interference canceller of the laptop can suppress or cancel interference caused by other interfering packets subsequently transmitted by the base station of the OBSS. In some cases, the interference is suppressed during carrier sensing such that the laptop can better detect intended packets transmitted by a base station of the laptop's own BSS. The interference canceller can also cancel or remove at least a portion of the interference from the intended packets when received (e.g., before normal receive processing), thereby improving receiver performance of the laptop. These are but a few examples of the ways in which aspects of interference cancellation for receivers with multiple antennas may improve receive performance of a wireless device.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example of an operating environment 100 having a host device 102 and client devices 104 that are capable of communicating data, symbols, packets, protocol data units (PDUs), and/or frames over a wireless connection 106, such as a wireless-local-area network (WLAN). The WLAN may operate in accordance with various Institute of Electronics and Electrical Engineers (IEEE) 802.11 standards that may include IEEE 802.11ac, IEEE 802.11ad, IEEE 802.11ax, IEEE 802.11ay, IEEE 802.11-2016, or the like. Alternately or additionally, the wireless connection 106 or other wireless connections of the devices may be implemented as a personal area network (PAN), peer-to-peer network, mesh network, or cellular network, such as a 3rd Generation Partnership Project Long-Term Evolution (3GPP LTE) network.

In this example, the host device 102 is embodied as an access point that is capable of providing and managing a wireless network, such as a wireless fidelity network (WiFi network) in accordance with any of the IEEE 802.11 standards, that includes one or more wireless connections 106 with respective client devices 104. In other cases, the host device 102 may include or be embodied as a base station, enhanced node base station, wireless router, broadband router, modem device, gaming device, or other network administration device. The client devices 104 of the example environment 100 include a smart-phone 108, tablet computer 110, laptop computer 112, and set-top box 114. Although not shown, other configurations of the client devices 104 are also contemplated, such as a desktop computer, a server, gaming controllers, wearable smart-device, television, content-streaming device, high-definition multimedia interface (HDMI) media stick, wearable-computers, mobile-internet device (MID), a network-attached-storage (NAS) drive, mobile gaming console, and so on.

Generally, the host device 102 provides connectivity to the Internet, other networks, or networked-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the host device 102 via an appropriately configured modem (not shown). While associated with the host device 102 via the wireless connection 106, the smart-phone 108, laptop computer 110, or set-top box 112 may access the Internet, communicate with each other, or access other networks for which host device 102 acts as a gateway.

The host device 102 includes a processor 114 configured to execute processor-executable instructions and computer-readable storage media 116 (CRM 116). In some cases, the processor 114 is implemented as an application processor or baseband processor to manage operation and connectivity of the host device 102. The CRM 116 of the host device 102 may include any suitable type and/or combination of storage media, such as read-only memory (ROM), random access memory (RAM), or Flash memory. The CRM 116 may store firmware, an operating system, or applications of the host device 102 as instructions that are executed by the processor 114 to implement various functionalities of the host device 102. In this example, a communications controller 118 for managing communication operations of the host device 102 is embodied on the CRM 116.

The communications controller 118 may include or represent any suitable combination of components to enable various communication operations, such as a precoder, channel sounder, beamforming module, multiple-input multiple-output (MIMO) module, spatial stream processor, or the like. Although not shown, the communication controller 118 may include components for implementing one or more aspects of interference cancellation as described herein. The implementations and/or uses of the communications controller 118 vary, and are described throughout the disclosure.

The host device 102 also includes a transmitter 120, receiver 122, and antennas 124 for providing a wireless network, communicating with the client devices 104, or communicating other wirelessly-enabled devices. The transmitter 120 or receiver 122 may include any suitable number of respective communication paths (e.g., transmit or receive chains) to support transmission or reception of multiple spatial streams of data. Although not shown, radio frequency (RF) front-end circuitry of the host device 102 can couple or connect the transmitter 120 or receiver 122 to the antennas 124 to facilitate various types of wireless communication. The antennas 124 of the host device 102 may include an array of multiple antennas that are configured similar to or differently from each other.

Each of client devices 104 (e.g., mobile stations) includes a processor 126 and computer-readable storage media 128 (CRM 128). The processor 126 can be any suitable type of processor, either single-core or multi-core, for executing instructions or code associated with applications and/or an operating system of the client device 104. The CRM 128 may include any type and/or combination of suitable storage media, such as RAM, non-volatile RAM (NVRAM), ROM, or Flash memory useful to store data of applications and/or an operating system of the client device 104.

In this example, an interference estimator 130, interference canceller 132, and interference channel 134 of the client device 104 are also embodied on the CRM 128. Generally, the interference estimator may estimate one or more interference channels 134 for a wireless environment based on interference packets or interference signals received by the client device 104. The interference canceller 132 may use an interference channel 134 to suppress or cancel interference, such as interference caused by subsequently transmitted interference packets or interference signals. When interference cancellation is implemented by a host device 102, instances of an interference estimator 130, interference canceller 132, and/or interference channel 134 can be implemented by or through the communications controller 118. The implementations and uses of these entities vary, and are described throughout the disclosure.

The client devices 104 also includes a transmitter 136, receiver 138, and antennas 140 for communicating with the host device 102 or other wirelessly-enabled devices. Although shown as separate entities, the transmitter 136 and receiver 138 may be implemented in combination as a transceiver component that supports both transmit and receive functionalities. The transmitter 136 or receiver 138 may include any suitable number of respective communication paths (e.g., transmit or receive chains) to support transmission or reception of multiple spatial streams of data. Front-end circuitry (not shown) of the client device 104 may couple or connect the transmitter 136 or receiver 138 to the antennas 140 to facilitate various types of wireless communication. The antennas 140 may include an array of multiple antennas that are configured similar to or differently from each other.

Figure 2:
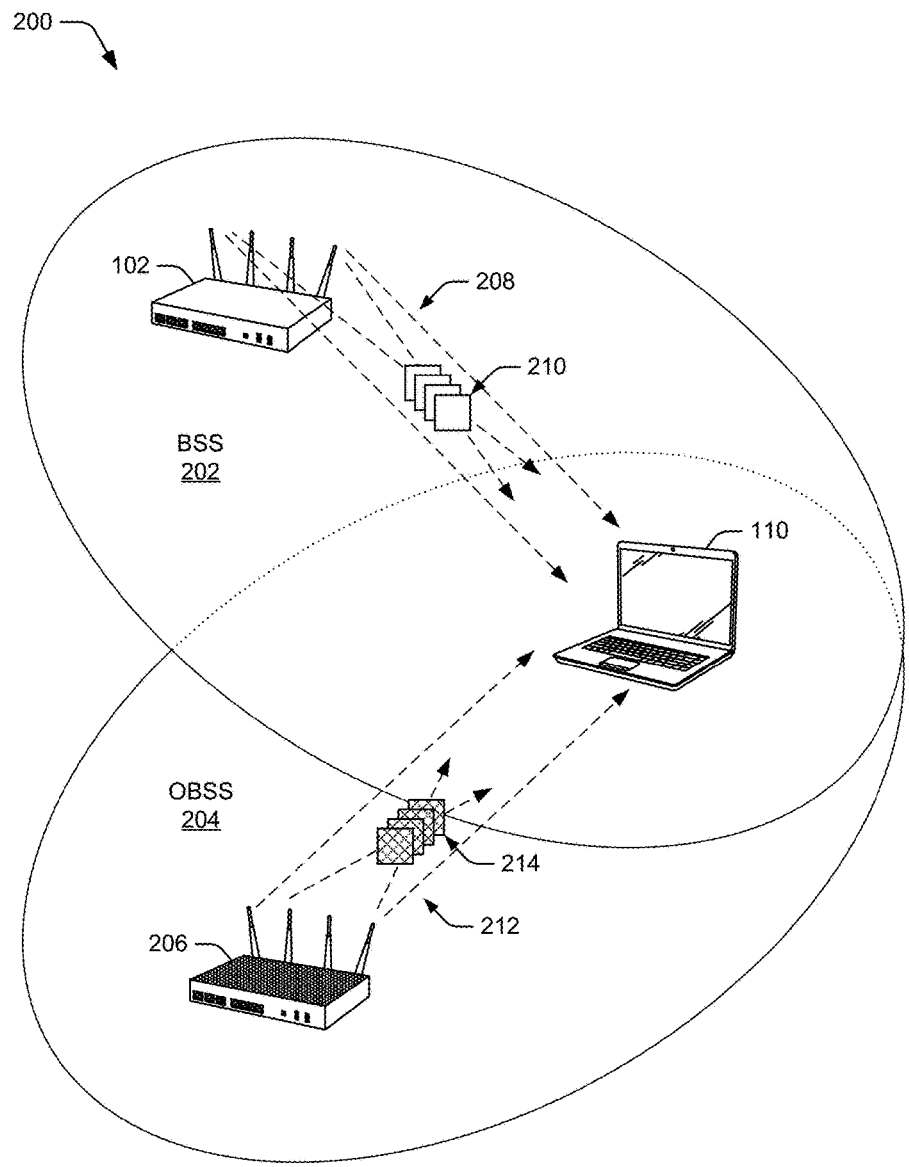
FIG. 2 illustrates an example wireless networking environment that includes devices of a basic service set and an overlapping basic service set.

FIG. 2 illustrates example wireless networking environment 200 that includes devices of a basic service set 202 (BSS 202) that is managed by the host device 102. The wireless network environment 200 also includes an overlapping BSS 204 (OBSS 204) that is managed by an access point 206. As shown in FIG. 2, respective communication areas of the BSS 202 and the OBSS 204 overlap such that devices or stations of either network may be within range of other devices or stations of the other network. Here, assume that laptop 110 is associated with the host device 102 and communicates as part of the BSS 202. The BSS 202 and/or OBSS 204 may be provided or managed in accordance with any suitable wireless communication protocol or standard, such as IEEE 802.11ac, IEEE 802.11ad, IEEE 802.11ax, IEEE 802.11ay, IEEE 802.11-2016, or the like. Although shown as including infrastructure type WiFi networks, the networking environment 200 may also be implemented with one or more of a peer-to-peer network, mesh network, personal area network, or cellular network.

In some aspects, some of the devices of the wireless networking environment are configured to implemented multiple-input multiple-output (MIMO) communications. As shown in FIG. 2, the host device 102 can transmit multiple spatial streams 208 by which packets 210 encoded for transmission to the laptop 110. Here, the packets 210 are may be referred to as intended packets, which are intended for reception by the laptop 110. Generally, intended communications or data are exchanged between devices or stations of a same BSS or wireless network, such as BSS 202. With reference to a physical (PHY) layer of the 802.11 standard, transceivers of the devices may implement a Physical Layer Convergence Procedure (PLCP) sublayer for communicating frames or packets. The PLCP sublayer may prepare a frame for transmission by taking the frame from the media access control (MAC) sublayer and creating a PLCP Protocol Data Unit (PPDU) packet. A physical medium dependent (PMD) sublayer of the PHY then modulates and transmits the packet data as bits. Accordingly, any data, packet, or frame described herein may include a protocol data unit (PDU), MAC PDU (MPDU), PLCP service data unit (PSDU), PLCP PDU (PPDU), or the like.

The wireless networking environment also includes the overlapping basic service set 204, which includes the access point 206. Generally, the access point 206 communicates with other devices or clients of the OBSS 204 (not shown). In the context of this example, however, the base station 206 is an interfering transmitter or source of interference for the devices of BSS 202. Here, assume that a device of the OBSS 204 is located approximately between the base station 206 of the OBSS 204 and the laptop 110 (or any other device) of the BSS 202. Spatial streams 212 transmitted by the base station 206 that include packets 214 can interfere (e.g., interfering packets) with communication operations of the laptop 110. As such, transmitted signals or other communications originating from the OBSS 204 may be referred to as interfering signal, interfering packets, or generally as interference for the devices of BSS 202. In other words, the interference of the OBSS 204 may impair or degrade receiver performance of the devices of the BSS 202 attempting communication of intended packets or information. Similar to packets 210, the interfering packets 214 may include any suitable type of packet or frame, such as a PDU, MPDU, PSDU, PPDU, or the like.

Figure 3:
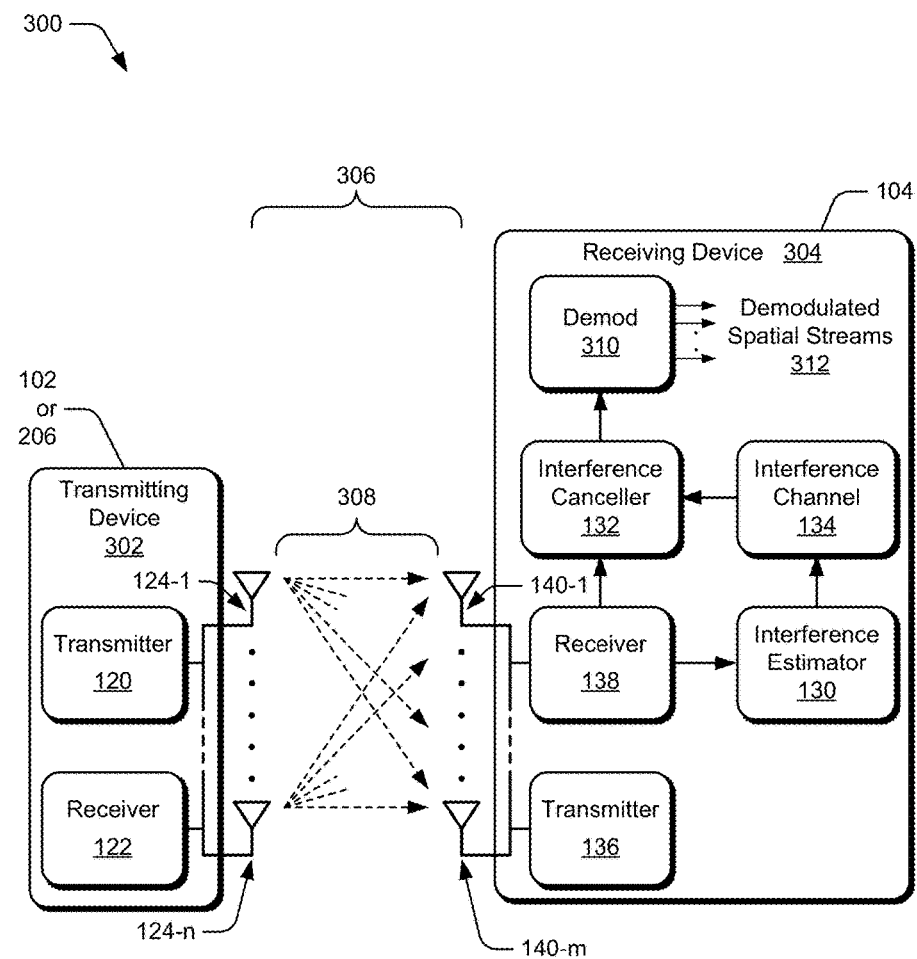
FIG. 3 illustrates example configurations of the devices of FIG. 1 that are implemented as respective transmitting and receiving devices.

FIG. 3 illustrates example configurations of a host device 102 and client device 104 at 300 that are implemented as a transmitting device 302 and receiving device 304, respectively. In this example, the host device 102 is shown as the transmitting device 302 and the client device 104 is shown as the receiving device 304, though these roles may be reversed depending on a direction of communication and/or interference reception. For the context of this discussion, the transmitting device 302 also be embodied as an interfering transmitter (e.g., base station 206) or device that transmits interfering signals or packets, such as interfering spatial streams 212 or interfering packets 214.

Generally, the transmitting device 302 and receiving device 304 communicate via channel 306 of a wireless environment (e.g., wireless medium), such as air, the atmosphere, or other media through which electromagnetic (EM) waves propagate. A channel 306 between the transmitting device 302 and the receiving device 304 (e.g., one of the client devices 104) may be characterized by information that describes conditions or a state of the channel. In some cases, this channel state information (CSI) is useful to adjust or refine transmission or reception parameters of signals transmitted or received through the channel 306 by various ones of the devices. To determine the conditions or state of the channel 306, the receiving device 304 may implement interference sensing or detection operations by which the channel 306 is characterized (e.g., measured) prior to the reception of spatial streams (e.g., signal or data streams) from an intended transmitter.

In aspects of interference cancellation, the interference estimator 130 of the receiver 304 can be implemented to estimate an interference channel or state information that describes conditions associated with interference caused by transmissions of an interfering device in a wireless environment. Here, assume that the transmitter 302 is the base station 206 of the OBSS, which transmits interfering spatial streams 212 and interfering packets 214 while devices of the BSS 202 attempt to communicate. As shown in FIG. 3, spatial streams 308 of the transmitter 302, which may include the interfering spatial streams 212 and/or packets 214, are transmitted via the antennas 124-1 through 124-n of the transmitter 302. Across the channel 306 of the wireless environment, the receiver 304 receives one or more of spatial streams 308 that have been affected by conditions of the channel 306, such as distance, fading, multipath reflections, and the like. The receiver 138 can receive or detect each of the spatial streams 308 (or packets) at the antennas 140-1 through 140-m of the receiver 304. Thus, the receiver 304 can obtain channel information (e.g., channel response) about respective signal paths between a transmitter, such as an interfering transmitter, and each of the antennas 140-1 through 140-m at which the interference is received.

The receiver 138 coupled to the antennas 140-1 through 140-m may provide any or all received spatial streams, packet, or signals to the interference estimator 130 for analysis. In some aspects, the interference estimator 130 estimates an interference channel 134 based on the received spatial streams, packets, or signals. The interference channel 134 may include state information about, describe, or characterize interference caused by an interfering transmitter operating in the wireless environment, such as the base station 206 of the OBSS 204. The interference channel 134 may be associated with a particular interfering device, such that the interference estimator 130 may estimate or provide multiple interference channels 134 associated with multiple respective interfering devices.

The interference canceller 132 of the receiving device 304 may use the interference channel 134 to suppress or cancel interference. For example, the receiver 138 may implement carrier sensing to detect transmission of intended packets by the host device 102 or another device with which the receiving device is associated. In such cases, the interference canceller 132 may suppress, based on the interference channel 134, interference caused by an interfering transmitter while carrier sensing is performed. When other spatial streams or packets are received, such as intended packets, the interference canceller 132 may cancel at least a portion of interference received with the intended packets using the interference channel. In some cases, after interference cancellation, the interference canceller 132 provides the spatial streams to a demodulator 310 for demodulation and decoding to provide demodulated spatial streams 312 of the data for use by the receiving device 304.

Techniques of Interference Cancellation

The following discussion describes techniques of interference cancellation, which may reduce effects of interfering packets or signals and improve receiver performance. These techniques can be implemented using any of the environments and entities described herein, such as the interference estimator 130, interference canceller 132, or interference channel 134. These techniques include methods illustrated in FIGS. 4, 6, and 7, each of which is shown as a set of operations performed by one or more entities. These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement interference estimation, carrier sensing, and/or interference cancellation operations during in an environment in which an interfering transmitter operates. In portions of the following discussion, reference will be made to the operating environment 100 of FIG. 1, networking environment 200 of FIG. 2, and entities of FIG. 3 by way of example. Such reference is not to be taken as limiting described aspects to operating environment 100 or specific entities, but rather as illustrative of one of a variety of examples.

Figure 4:
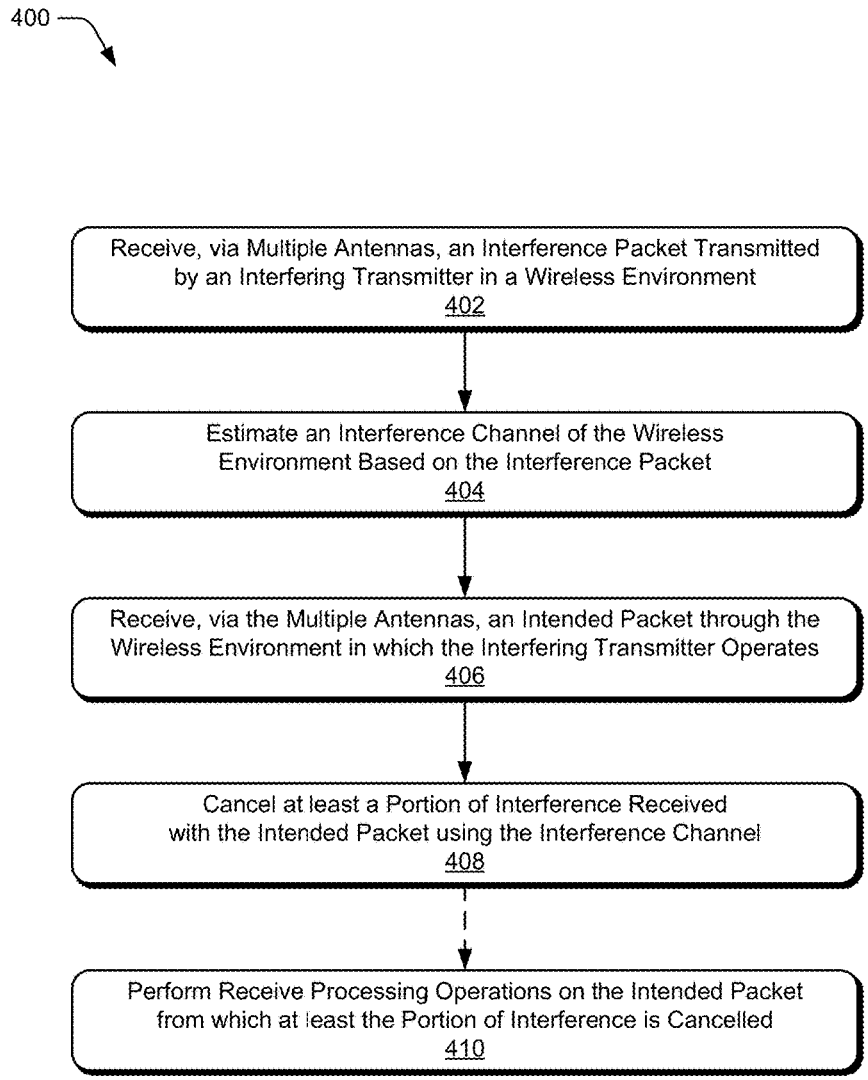
FIG. 4 illustrates an example method of interference cancellation for receivers with multiple antennas.

FIG. 4 depicts an example method 400 of interference cancellation for receivers with multiple antennas, including operations performed by the interference estimator 130 and interference canceller 132.

At 402, an interference packet transmitted by an interfering transmitter is received via multiple antennas of a receiver. The interfering transmitter may operate in or transmit the interfering packet through a wireless environment. In some cases, the interfering transmitter is a base station or client station of an overlapping basic service set. In such cases, the interfering packet may comprise a PDU compliant with any suitable networking protocol or standard. Alternately or additionally, an interference signal may be received via the multiple antennas.

Figure 5:
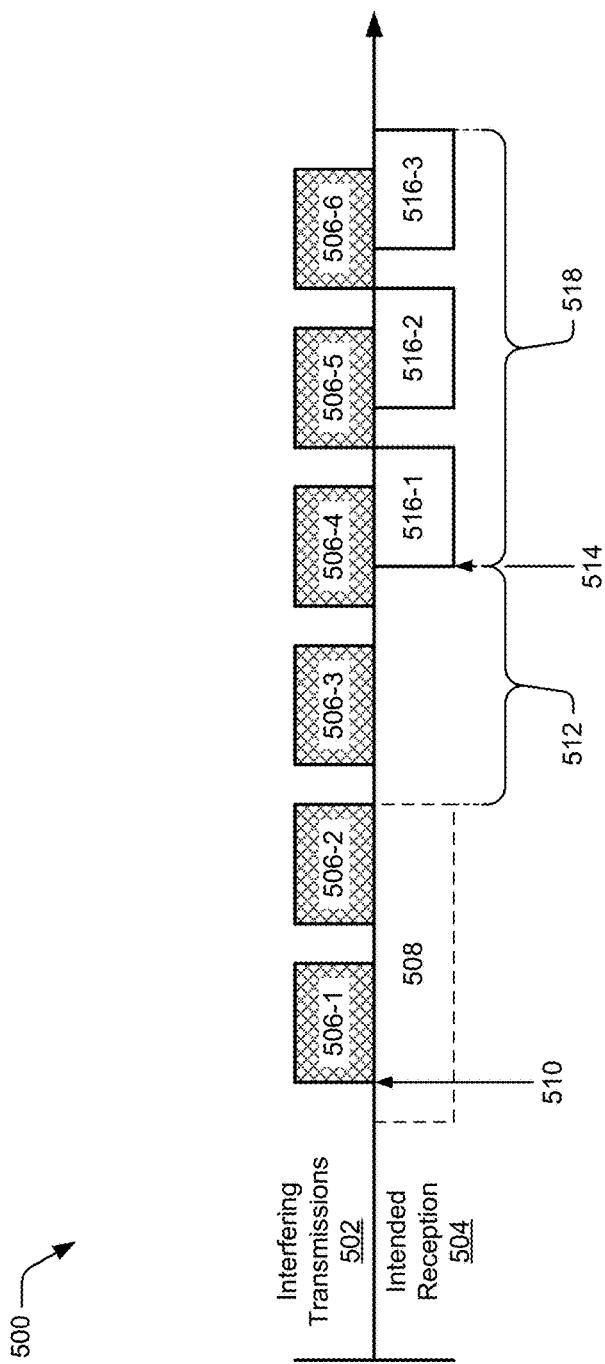
FIG. 5 illustrates an example timeline of packet communication in accordance with one or more aspects.

By way of example, consider FIG. 5 which illustrates an example timeline 500 of packet reception by a device with multiple antennas. For visual clarity, interfering transmissions 502 are shown above the timeline 500 and intended reception 504 is shown below the timeline 500. Here, assume that in interfering transmitter, such as a base station of an OBSS, transmits a stream of interfering packets 506-1 through 506-6 while a receiver listens for intended packets from a base station with which the receiver is associated. To do so, the receiver may be configured to sense or detect interfering packets or signals for a duration of time 508. The duration of time 508 or a window during which interference is sensed can be configured for any suitable amount of time. In some cases, the duration of time 508 is configured to occur prior to a time at which packets are expected to be received from an intended transmitter. As shown in FIG. 5, an interference packet 506-1 is received by the receiver.

At 404, an inference channel of the wireless environment is estimated based on the interference packet. The interference channel may describe or characterize interference observed in the wireless environment that is associated with the interfering transmitter. In some cases, the interference packet includes a protocol data unit (PDU) or other frame transmitted in accordance with wireless protocol or standard. In such cases, the interference channel can be estimated by performing a per-tone channel estimation based on long training fields of the PDU or frame. Alternately or additionally, the interference packet may not comply with a standard or protocol by which the receive communicates. To provide an interference channel, a blind channel estimation may be performed based on the interfering packet or interfering signal.

In the context of the present example, interference is detected by the receiver at 510, and an interference estimator of the receiver may start to estimate in interference channel $\hat{H}_i$. Based on the reception of one or more interference packets (or signals), the interference estimator may estimate or generate an interference channel or interference matrix as shown by equation 1. Here, assume that a number of spatial streams ($N_{SS\ Total}$) and a number to transmit antennas ($N_{TX}$) both equal four, though the interference channel or interference matrix may be non-square in other instances.

$\hat{H}_i$, where a size of $\hat{H}_i$ is $N_{SS\ Total} \times N_{TX}$     Equation 1: Interference Channel Matrix $\hat{H}_i$ At 406, an intended packet transmitted through the wireless environment is received via the multiple antennas. The intended packet may be transmitted by another device or station with which the receiving device is associated, such as another device of a BSS to which the receiving device belongs. In some cases, the intended packet is received via multiple spatial streams or as a packet transmitted as a MIMO communication. Reception of the intended packet may be initiated in response to a trigger of carrier sensing by the receiver. Alternately or additionally, interference may be suppressed during carrier sensing by the receiver to improve receiver sensitivity.

Continuing the ongoing example, the receiver implements carrier sensing at 512 to listen for intended packets. The carrier sensing may be initiated after an interference channel is estimated, which permits the suppression of interference during carrier sensing operations. In some cases, interference caused by other interfering packets transmitted by an interfering transmitter is suppressed based on the interference channel. As shown at 514, the carrier sensing is triggered by an intended packet 516-1, at which point reception of the intended packet 516-1 is initiated by the receiver.

At 408, at least a portion of interference received with the intended packet is cancelled using the interference channel. The interference received with the intended packet may be associated with interfering packet or signals transmitted by the interfering transmitter. In some cases, the interference is cancelled or removed from the intended packet in a spatial domain using a channel interference matrix. In such cases, a per-tone cancellation can be performed in which each tone of the interference signal is zero-forced using a null matrix. Other per-tone cancellations, such as minimum square error methods, may also be used to cancel or reduce interference. Alternately or additionally, the interference can be cancelled in a time-domain with the interference channel or similar interference information.

In the context of the present example, an interference canceller of the receiver cancels the interference caused by the interfering packets 506-4 through 506-6 in a spatial domain using the interference channel matrix. To do so, a per-tone cancellation is performed to zero-force the interference signal. Here, let $y_k$ represent a received signal vector and $\hat{H}_{i,k}$ represent the estimated interference channel on the k-th tone. Interference can then be cancelled by the interference canceller as shown in equation 2.

$\tilde{y}_k = \text{null}(\hat{H}_{i,k}) y_k$, where $\text{null}(\hat{H}_{i,k}) \hat{H}_{i,k} = 0$     Equation 2: Interference Cancellation for Received Signal Vectors Optionally at 410, receive processing operations are performed on the intended packet from which at least the portion of the interference is cancelled. The noise-cancelled intended packet or spatial streams may be provided to any suitable receive processing circuitry or components of the receiver. Concluding the present example, the noise-cancelled signal vector $\tilde{y}_k$ is provided to receive processing components of the receiver, such as a demodulator or decoder, for receive processing to provide receive data.

Figure 6:
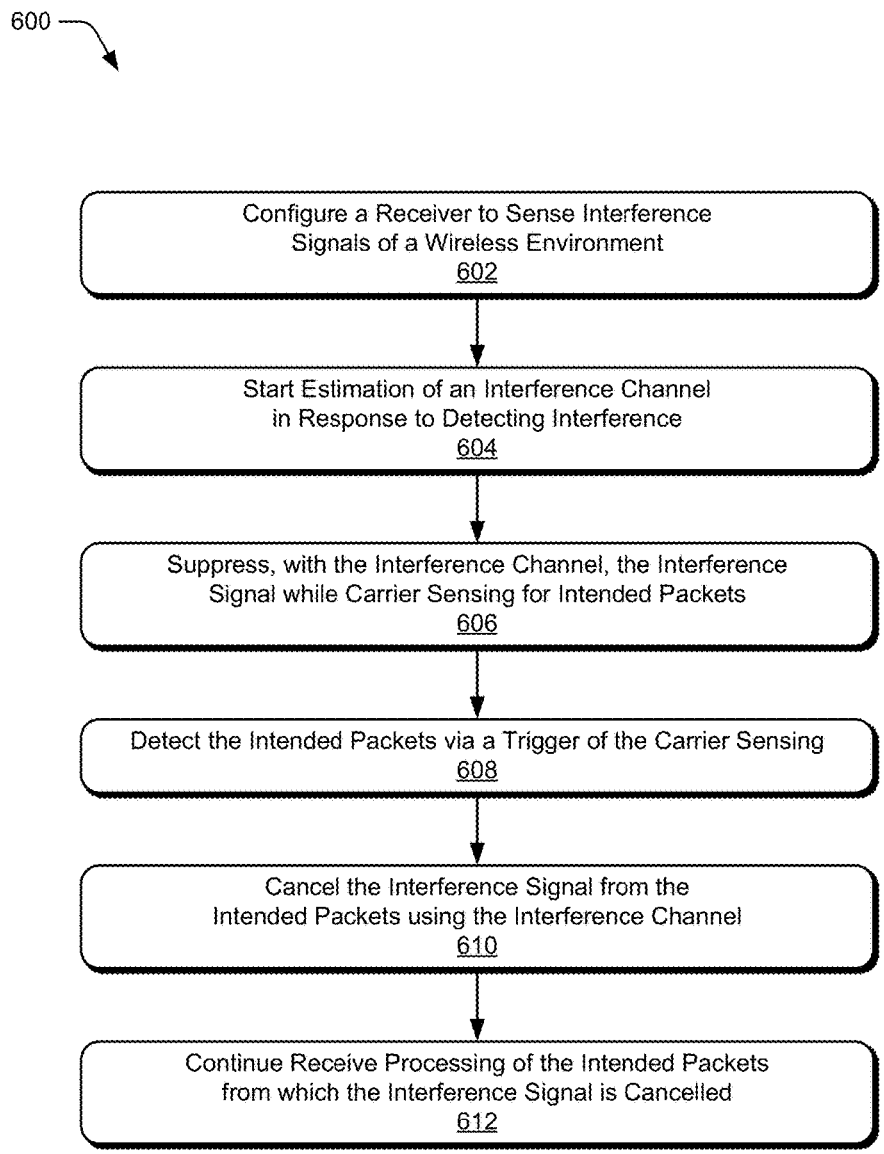
FIG. 6 depicts an example method for cancelling an interference signal from intended packets.

FIG. 6 depicts an example method 600 for compensating a determinant of a sub-matrix of a channel covariance matrix, including operations performed by the interference estimator 130 and interference canceller 132.

At 602, a receiver of a device is configured to sense interference signals of a wireless environment. The receiver may be configured to sense or detect interfering signals or packets prior to the expected arrival of packets transmitted by another device with which the device is associated. In some cases, the receiver is configured to sense signals that are not compliant with a protocol or standard by which the receiver is configured to communicate.

At 604, estimation of an interference channel is started in response to detecting an interference signal. The interference channel may be estimated based on one or more detected interference signals. For example, the interference channel can be estimated based on multiple signals or multiple spatial streams transmitted by an interfering device that communicates using MIMO modes of communication.

At 606, the interference signal is suppressed, with the interference channel, while carrier sensing for intended packets. The interference signal may be suppressed in a spatial domain or in a time domain. In some cases, a phase of a respective signal received via each of the multiple antennas is rotated based on the interference channel such that, when combined, the interference caused by the interfering signal is nulled or suppressed. In other cases, amplitude of a respective signal received via each of the multiple antennas can also be scaled to achieve interference cancellation or for interference reduction purposes. In some aspects, phase rotation and amplitude scaling may be combined to cancel or reduce the interference signal, effects of interfering packets, or the like.

At 608, the intended packets are detected via a trigger of the carrier sensing. The carrier sensing may be implemented by the receiver and with the interference canceller such that the carrier sensing operations are better able to detect the intended packets. The triggering of the carrier sensing may also be effective to initiate interference cancellation operations for intended packets before, during, or after reception.

At 610, the interference signal is cancelled from the intended packets using the interference channel. The interference received with the intended packet may be associated with interfering packet or signals transmitted by the interfering transmitter. In some cases, the interference is cancelled or removed from the intended packet in a spatial domain using a channel interference matrix. Alternately or additionally, the interference can be cancelled in a time-domain with the interference channel or similar interference information.

At 612, receive operations are continued for the intended packets from which the interference signal is cancelled. The intended packets or spatial streams may be provided to any suitable receive circuitry or components, such as a demodulator, decoder, digital signal processor, baseband processor, or the like. Receive data provided by the receive processing operations may then be used or stored by the device.

Figure 7:
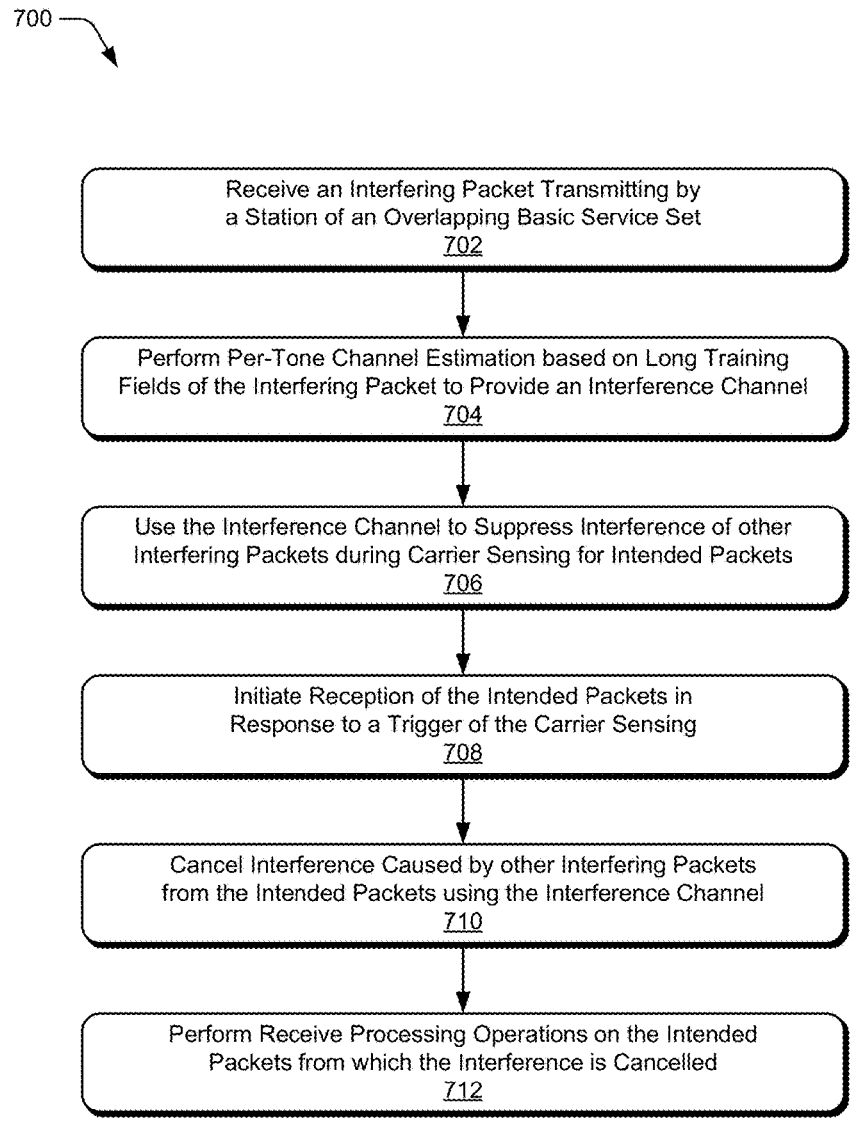
FIG. 7 depicts an example method for cancelling interference caused by interfering packets of an overlapping basic service set.

FIG. 7 depicts an example method 700 for cancelling interference caused by interfering packets of an overlapping basic service set, including operations performed by the interference estimator 130 and interference canceller 132.

At 702, an interfering packet transmitted by a station of an overlapping basic service set is received. The interfering packet may be transmitted by a base station or mobile station of the overlapping basic service set. In some cases, the interfering packet is transmitted using multiple spatial streams as part of a MIMO communication between stations of the overlapping basic service set. Alternately or additionally, the interfering packet can be a PPDU originating from the overlapping basic service set.

At 704, per-tone channel estimation is performed based on long training fields of the interfering packet to provide an interference channel. For example, when the interfering packet is a PPDU or WiFi packet of the overlapping basic service set, the per-tone channel estimation can be performed using the long training fields of the PPDU. Alternately or additionally, blind channel estimation can be performed to provide the interference channel, such as for non-WiFi packets.

At 706, the interference channel is used to suppress interference of other interfering packets during carrier sensing for intended packets. The interference of the other packets may be suppressed in a spatial domain or in a time domain. In some cases, a phase of a respective signal received via each of the multiple antennas is rotated based on the interference channel such that, when combined, the interference caused by the interfering packets is nulled or suppressed.

At 708, reception of the intended packet is initiated in response to a trigger of the carrier sensing. The carrier sensing may be implemented by the receiver and with the interference canceller such that the carrier sensing operations are better able to detect the intended packets. The triggering of the carrier sensing may also be effective to initiate interference cancellation operations for intended packets before, during, or after reception.

At 710, interference caused by the other interfering packets is cancelled from the intended packets using the interference channel. In some cases, the interference is cancelled or removed from the intended packets in a spatial domain using a channel interference matrix. In such cases, a per-tone cancellation can be performed in which each tone of the interference signal is zero-forced using a null matrix. Alternately or additionally, the interference can be cancelled in a time-domain with the interference channel or similar interference information.

At 712, receive processing operations are performed on the intended packets from which the interference is cancelled. The intended packets or spatial streams may be provided to any suitable receive circuitry or components, such as a demodulator, decoder, digital signal processor, baseband processor, or the like. Receive data provided by the receive processing operations may then be used or stored by the device.

System-On-Chip

Figure 8:
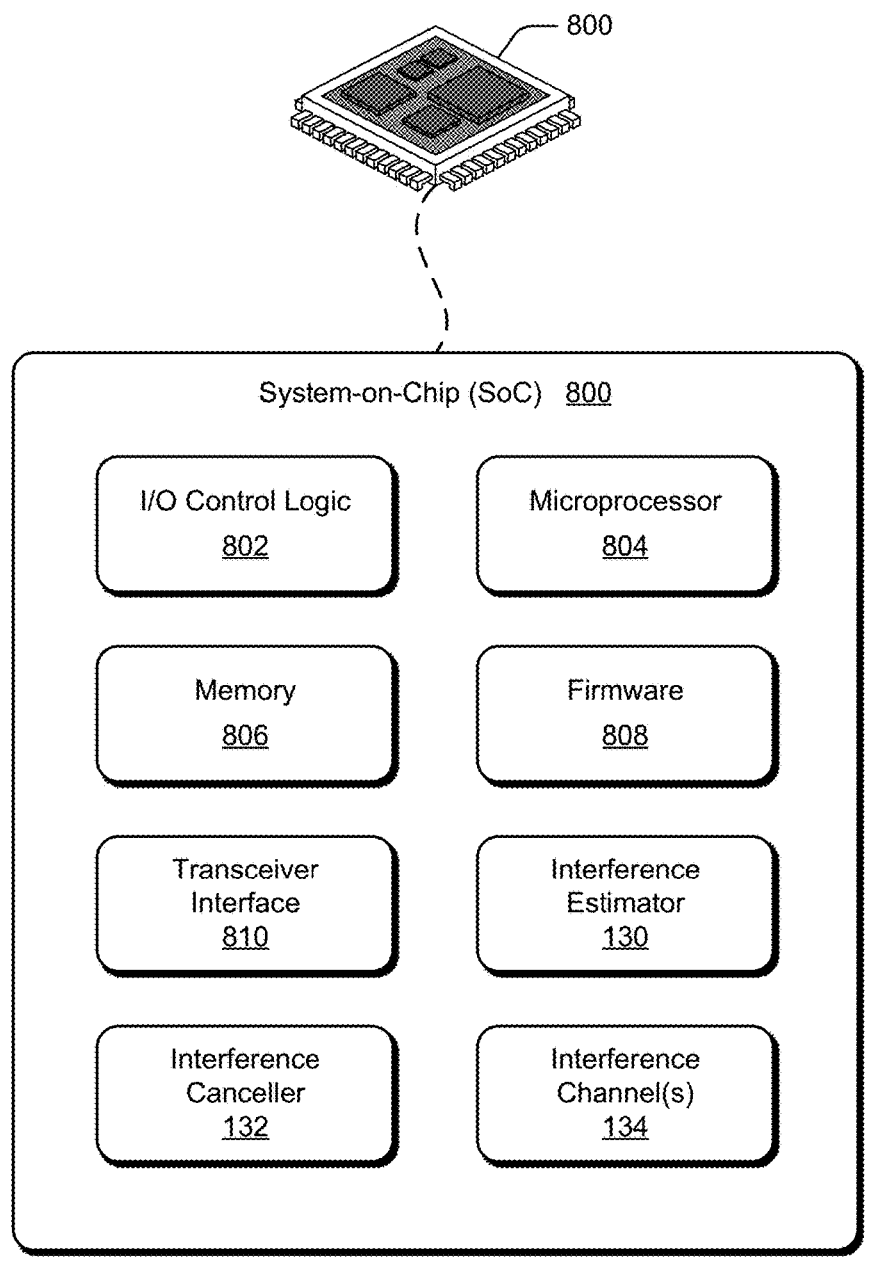
FIG. 8 illustrates an example System-on-Chip (SoC) environment for implementing aspects of interference cancellation for receivers with multiple antennas.

FIG. 8 illustrates an exemplary System-on-Chip (SoC) 800 that can implement various aspects of interference cancellation for receivers with multiple antennas. The SoC 800 can be implemented in any suitable device, such as a smart-phone, cellular phone, netbook, tablet computer, access point, wireless router, network-attached storage, camera, smart appliance, printer, a set-top box, or any other suitable type of device. Although described with reference to a SoC, the entities of FIG. 8 may also be implemented as an application-specific integrated-circuit (ASIC), chip set, communications controller, application-specific standard product (ASSP), digital signal processor (DSP), programmable SoC (PSoC), system-in-package (SiP), or field-programmable gate array (FPGA).

The SoC 800 can be integrated with electronic circuitry, a microprocessor, memory, input-output (I/O) control logic, communication interfaces, other hardware, firmware, and/or software useful to provide functionalities of a device, such as any of the devices listed herein. The SoC 800 can also include an integrated data bus or interconnect fabric (not shown) that couples the various components of the SoC for data communication between the components. The integrated data bus, interconnect fabric, or other components of the SoC 800 may be exposed or accessed through an external port, such as a Joint Test Action Group (JTAG) port or serial peripheral interface (SPI) port. For example, components the SoC 800 may be configured, programmed (e.g., flashed), or accessed through the external port at different stages of manufacture, provisioning, deployment, or field service.

In this example, the SoC 800 includes various components such as input-output (I/O) control logic 802 (e.g., to include electronic circuitry) and a microprocessor 804, such as a microcontroller, processor core, application processor, DSP, or the like. The SoC 800 also includes memory 806, which can be any type and/or combination of RAM, SRAM, DRAM, non-volatile memory, ROM, one-time programmable (OTP) memory, multiple-time programmable (MTP) memory, Flash memory, and/or other suitable electronic data storage. In the context of this disclosure, the memory 806 stores data, instructions, or other information via non-transitory signals, and does not include carrier waves or other transitory signals.

Alternately or additionally, SoC 800 may comprise a data interface (not shown) for accessing additional or expandable off-chip memory, such as external SRAM or Flash memory.

In some cases, the SoC 800 includes various applications, an operating system, software, and/or firmware, which can be embodied as processor-executable instructions maintained on the memory 806 for execution by the microprocessor 804. The SoC 800 can also include other communication interfaces, controllers, or interfaces, such as a transceiver interface 810 for controlling or communicating with components of a local on-chip (not shown) or off-chip wireless transceiver.

The SoC 800 also includes an interference estimator 130, interference canceller 132, and one or more interference channels 134, which may be embodied as disparate or combined components, as described with reference to various aspects presented herein. Examples of these components and/or entities, or corresponding functionality, are described with reference to the respective components or entities of the environment 100, networking environment 200, or device configurations shown at 300. The interference estimator 130 and interference canceller 132, either in whole or part, can be implemented as processor-executable instructions maintained by the memory 806 and executed by the microprocessor 804 to implement various aspects and/or features interference cancellation for receivers with multiple antennas.

The interference estimator 130 or interference canceller 132, can be implemented independently or in combination with any suitable component or circuitry to implement aspects described herein. For example, the interference estimator 130, interference canceller 132, or a buffer storing interference channel 134 information may be implemented as part of a DSP, arithmetic logic unit (ALU), matrix processor, decoding block, demodulation block, or the like. The interference estimator 130 and/or interference canceller 132 may also be provided integral with other entities of SoC 800, such as integrated with the microprocessor 804, signal processing block, vector processing block, or transceiver interface 810 within the SoC 800. Alternately or additionally, the interference estimator 130, interference canceller 132, and other components of the SoC 800 can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A device implemented method comprising:
   receiving, via multiple antennas of the device, an interference packet transmitted by an interfering transmitter in a wireless environment;
   estimating an interference channel that describes interference in the wireless environment based on the interference packet received from the interfering transmitter;
   implementing carrier sensing to enable detection of an intended packet transmitted by a base station or client station with which the device is associated;
   suppressing, while the carrier sensing is implemented and based on the interference channel, interference caused by other interfering packets transmitted by the interfering transmitter;
   receiving, via the multiple antennas of the device, the intended packet transmitted through the wireless environment in which the interfering transmitter operates; and
   cancelling at least a portion of interference received with the intended packet using the interference channel.

2. The method as recited in claim 1, further comprising performing receive processing operations on the intended packet from which at least the portion of interference is cancelled.

3. The method as recited in claim 1, further comprising initiating reception of the intended packet in response to a trigger of the carrier sensing that is implemented while the interference is suppressed.

4. The method as recited in claim 1, wherein suppressing the interference comprises rotating, based on the interference channel, a phase of a respective signal received via each of the multiple antennas effective to suppress or null the interference caused by the other interfering packets.

5. The method as recited in claim 1, wherein suppressing the interference comprises scaling, based on the interference channel, an amplitude of a respective signal received via each of the multiple antennas effective to suppress or null the interference caused by the other interfering packets.

6. The method as recited in claim 1, wherein cancelling at least a portion of the interference received with the intended packet comprises one of:
   implementing a zero-forcing per-tone cancellation in which each tone of the interference signal is zero-forced using a null matrix; or
   implementing a minimum mean square error (MMSE) estimation method to perform the per-tone cancellation.

7. The method as recited in claim 6, wherein the null matrix of the zero-forcing per-tone cancellation comprises rows that form a basis of null space for a column space of the interference channel.

8. The method as recited in claim 1, wherein the method is implemented to communicate in accordance with one of the IEEE 802.11ac specification, the IEEE 802.11ad specification, the IEEE 802.11ax specification, or the IEEE 802.11ay specification.

9. An apparatus for wireless communication comprising:
   multiple antennas;
   a receiver having multiple inputs coupled to respective ones of the multiple antennas and being configured to receive data in a wireless environment;
   an interference estimator configured to:
      receive, via the multiple antennas, an interference packet transmitted by an interfering transmitter in the wireless environment;
      estimate an interference channel that describes interference in the wireless environment based on the interference packet received from the interfering transmitter; and
   an interference canceller configured to:
      implement carrier sensing to enable detection of an intended packet transmitted by a station with which the device is associated;
      suppress, while the carrier sensing is implemented and based on the interference channel, interference caused by other interfering packets transmitted by the interfering transmitter;
      receive, via the multiple antennas, the intended packet transmitted through the wireless environment in which the interfering transmitter operates; and
      cancel at least a portion of interference received with the intended packet using the interference channel.

10. The apparatus as recited in claim 9, wherein the receiver is further configured to decode or demodulate the intended packet from which at least the portion of interference is cancelled.

11. The apparatus as recited in claim 9, wherein the interference canceller is further configured to initiate reception of the intended packet in response to a trigger of the carrier sensing that occurs while the interference is suppressed.

12. The apparatus as recited in claim 9, wherein:
the apparatus is configured as a base station or client station of a basic service set (BSS); and
the interfering transmitter is configured as a base station or client station of an overlapping basic service set (OBSS) that overlaps the basic service set of the apparatus.

13. The apparatus as recited in claim 9, wherein to suppress the interference, the interference canceller is further configured to:
rotate, based on the interference channel, a phase of a respective signal received via each of the multiple antennas effective to suppress or null the interference caused by the other interfering packets; or
scale, based on the interference channel, an amplitude of a respective signal received via each of the multiple antennas effective to suppress or null the interference caused by the other interfering packets.

14. A System-on-Chip (SoC) comprising:
a wireless transceiver circuit that includes multiple receive chains;
a hardware-based processor;
a memory storing processor-executable instructions that, responsive to execution by the hardware-based processor, implement (i) an interference estimator and (ii) interference canceller, (i) the interference estimator implemented to:
receive, via the multiple receive chains, an interference packet transmitted by an interfering transmitter of a wireless environment;
estimate an interference channel that describes interference in the wireless environment based on the interference packet received from the interfering transmitter; and
(ii) the interference canceller implemented to:
perform carrier sensing to enable detection of an intended packet transmitted by a base station or client station;
suppress, while the carrier sensing is performed and based on the interference channel, interference caused by other interfering packets transmitted by the interfering transmitter;
receive, via the multiple receive chains, the intended packet transmitted through the wireless environment in which the interfering transmitter operates; and
cancel at least a portion of interference received with the intended packet using the interference channel.

15. The SoC as recited in claim 14, wherein:
the interference packet comprises a protocol data unit (PDU) transmitted in accordance with an IEEE 802.11ac specification; and
the interference estimator is further implemented to estimate the interference by performing a per-tone channel estimation based on long training fields of the PDU.

16. The SoC as recited in claim 14, wherein:
the interference packet is not transmitted in accordance with an IEEE 802.11ac specification; and
the interference estimator is further implemented to estimate the interference by performing blind channel estimate based on the interference packet.

17. The SoC as recited in claim 14, wherein:
the interference estimator is further implemented to generate the interference channel as matrix of tone values; and
the interference canceller is further implemented to cancel at least the portion of the interference in a spatial domain using the channel interference matrix.

18. The SoC as recited in claim 14, wherein the SoC is embodied as or part of a modem processor, media access controller, wireless network interface, access point controller, or wireless communication chipset.

19. The SoC as recited in claim 14, wherein to suppress the interference, the interference canceller is further implemented to:
rotate, based on the interference channel, a phase of a respective signal received via each of the multiple antennas effective to suppress or null the interference caused by the other interfering packets; or
scale, based on the interference channel, an amplitude of a respective signal received via each of the multiple antennas effective to suppress or null the interference caused by the other interfering packets.

20. The SoC as recited in claim 14, wherein to cancel at least the portion of the interference received with the intended packet, the interference canceller is further implemented to:
perform a zero-forcing per-tone cancellation in which each tone of the interference signal is zero-forced using a null matrix; or
perform a minimum mean square error (MMSE) estimation method to perform the per-tone cancellation.

* * * * *